United States Patent
Simske et al.

(10) Patent No.: US 8,269,849 B2
(45) Date of Patent: Sep. 18, 2012

(54) METHOD AND SYSTEM FOR TESTING IMAGE PIPELINES

(75) Inventors: Steven J. Simske, Fort Collins, CO (US); Malgorzata M. Sturgill, Fort Collins, CO (US); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 12/359,267

(22) Filed: Jan. 23, 2009

(65) Prior Publication Data

US 2010/0188512 A1 Jul. 29, 2010

(51) Int. Cl.
*H04N 5/235* (2006.01)
*H04N 5/228* (2006.01)
*G06K 9/36* (2006.01)

(52) U.S. Cl. ..................... 348/222.1; 382/276

(58) Field of Classification Search ............. 348/207.99, 348/207.1, 222.1; 382/190, 192, 194, 195, 382/276; 708/233, 521; 714/737
See application file for complete search history.

(56) References Cited

U.S. PATENT DOCUMENTS

| | | | | |
|---|---|---|---|---|
| 6,064,393 A | * | 5/2000 | Lengyel et al. | 345/427 |
| 6,084,989 A | * | 7/2000 | Eppler | 382/293 |
| 6,738,494 B1 | * | 5/2004 | Savakis et al. | 382/100 |
| 6,880,122 B1 | * | 4/2005 | Lee et al. | 715/209 |
| 8,019,801 B1 | * | 9/2011 | Robb et al. | 707/899 |

OTHER PUBLICATIONS

Simske et al., "Low Resolution Photo/Drawing Classification: Metrics, Method and Archiving Optimization", Proceedings of the 2005 ACM Symposium on Doc Engineering, pp. 127-129.
Wang et al. "Image Quality Assessment: From Error Visibility to Structural Similarity", IEEE Transactions on Image Processing, vol. 13, No. 4, Apr. 2004, pp. 600-612.

* cited by examiner

*Primary Examiner* — Nicholas Giles

(57) ABSTRACT

A method for testing image pipelines includes transforming an untransformed captured image multiple times using a plurality of pipelines, thereby generating a plurality of transformed images, and comparing a functional set of metrics associated with each of the plurality of transformed images with a functional set of metrics associated with each image in a ground truth set. From the comparison, a determination is made as to which of the plurality of pipelines generates a transformed image that is functionally closest to an image in the ground truth set.

21 Claims, 1 Drawing Sheet

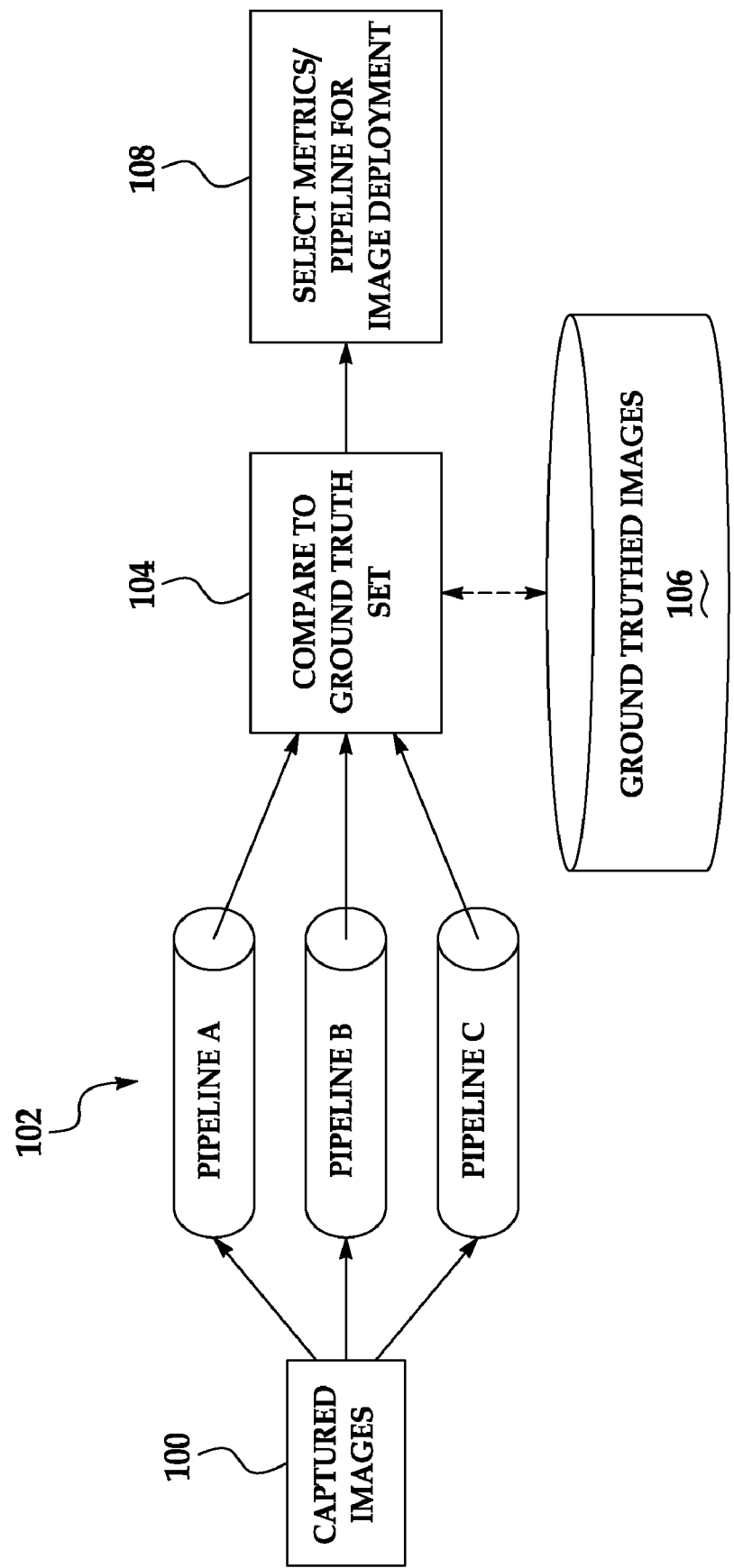

METHOD AND SYSTEM FOR TESTING IMAGE PIPELINES

BACKGROUND

The present disclosure relates generally to a method and system for testing image pipelines.

Product labeling and security packaging are important components of brand protection, product tracking and authenticating, as well as of anti-counterfeiting initiatives. Such labels/packages must be authorized (i.e., access to them should be privileged), authenticable (e.g., containing encoded/encrypted information that can be decoded/decrypted for security purposes), and unique (i.e., differentiable from any other printed material). In an effort to create such labels/packages, a unique ID, in the form of, for example, a deterrent or mark may be added. Furthermore, measures are often taken to enhance the probability that the product cannot be counterfeited, for example, by adding authenticating data (i.e., payload information) to the deterrent or mark, and/or by generating non-security printed areas with signatures idiosyncratic to their printing process (e.g., print engine type, print settings, etc.) which can be analyzed forensically.

BRIEF DESCRIPTION OF THE DRAWING

Features and advantages of embodiments of the present disclosure will become apparent by reference to the following detailed description and drawing.

FIG. 1 is a schematic flow diagram depicting an embodiment of the method for testing image pipelines.

DETAILED DESCRIPTION

Embodiments of the system and method disclosed herein advantageously afford a non-biased format for testing a multiplicity of pipelines simultaneously and quantitatively. The pipelines used are used in combination with a generic set of image metrics to best predict the suitability of an image or a transformed image for an end-application (such as, for example, decision-making, inspection, or authentication). It is to be understood that the set of metrics used to assess the images is generic and broad enough to allow the system to adapt such images for a specific end-application.

The method(s) disclosed herein are generally carried out utilizing a system including means for performing each of the steps. In one non-limiting example, the system includes a computer or enterprise computing system and programs or software configured to i) receive captured images, ii) subject the received images to one or more pipelines to transform the images, and iii) determine which pipeline(s) are best suited to obtain image(s) that functionally correspond with ground truth set image(s). As used herein, the phrase "ground truth set" refers to one or more images (i.e., ground truthed images) that do not need any additional processing in order to be suitable for use in a particular end application. Ground truth images may be scored by an expert (explicit ground truth), or created through the success of using the image correctly in an end application. The system also includes one or more secure registries which store the ground truthed images. Such secure registries are generally accessible by, or are a component of, the computer or enterprise computing system such that the system can compare the ground truthed images with those images which have been exposed to pipeline transformations.

As used herein, the term "enterprise computing system" means a network of interconnected computers, including virtualized and/or redundant processors, banks of processors and/or servers, etc. It is to be understood that the components of the system may be implemented in a consolidated location, or portion(s) of the system may be implemented at different locations.

The hardware of such a system includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor.

Computer program(s) and/or software (e.g., computer readable code) may be loaded onto the computer or enterprise computing system, and stored in a memory thereof. Such programs and/or software are executable via the processing device. Examples of such programs(s) and/or software include those configured to toggle (sequence) through available pipelines in a non-biased format (i.e., not dependent upon the metrics used to compare images) and to determine which pipelines to apply to such images in order to transform the image for a particular end use.

As a non-limiting example, if there are N=3 one-way components/algorithms to the pipeline (e.g., A, B, and C), then the following are possible pipelines: A; B; C; A|B; B|A; A|C; C|A; B|C; C|B; A|B|C; A|C|B; B|A|C; B|C|A; C|A|B; and C|B|A. There are $2^{(N+1)}=16$ pipelines (including a null pipeline, which is legitimate for a mass deployment). The null pipeline means that a transformation is not utilized (i.e., the image remains unaltered), which is a legitimate approach when many items are being tagged simultaneously). It is to be understood that when the components/algorithms are reversible, the order does not matter. In the above example, where N=3 and the components are reversible, the following are possible pipeline sets: A; B; C; A&B; A&C; B&C; A&B&C; and the null pipeline. As such, for this particular example involving reversible pipelines, there are $2^{(N)}=8$ pipelines.

The system may also include one or more algorithms that are executable via the electronic processing device. Such algorithms are incorporated into the computer or enterprise computing system and/or into the software. Generally, the pipelines are made up of one or more image processing algorithms. Non-limiting examples of such image processing algorithms include median filtering, dilation, erosion, sharpening, unsharp masking, halftone removal, contrast, auto-exposure, convolution, deblurring, thresholding, blurring, denoising, despeckling, texture fill, brightness correction, gamma correction, color balancing, skew correction, convolution, de-convolution, all Matlab operations, or the like, or combinations thereof. The listed algorithms are set forth as examples, and it is to be understood that other image processing algorithms not listed are suitable for use in the methods disclosed herein. Furthermore, not every component in the pipeline has to be a specific/traditional image processing algorithm or has to be associated with an image processing end goal. As such, one or more algorithms may be "stub" transformations, which are not generally associable with a specific image processing task (e.g., shuffling the pixels of an image). The pipeline components may be varied depending, at least in part, on the aims/goals of the end application and/or on how the stub transformations affect the overall utility of the pipeline.

It is to be further understood that two pipelines are different even if they include the same set of non-reversible algorithms, but the non-reversible algorithms are performed in a different sequence. For example, one-way median filtering followed by one-way dilation is a different pipeline than one-way dilation followed by one-way median filtering. However, transformations may be included in the pipelines that are specifically designed to be two-way functions (i.e., reversible), such as scrambling techniques, checksums, swapping, etc. A description of reversible transformations and their use in image deployment is further described in U.S. patent application Ser. No. 12/359,067, filed Jan. 23, 2009, the contents of which are incorporated by reference herein.

Referring now to FIG. 1, a schematic flow diagram of an embodiment of the method for testing image pipelines is depicted. As shown in reference numeral 100, one or more images are captured and are transmitted to the computer or enterprise computing system. The image(s) may be captured using an electronic device. In a non-limiting example, the electronic device is a scanner. Another suitable electronic device is a digital camera (embodied in, for example, a cellular phone, a personal digital assistant, or the like), an inspection camera, a tabletop imager, or the like.

The image(s) captured are often part of a training set of images. Training set images are those that have not yet been deployed with/on an object. When the embodiments of the method disclosed herein are utilized with training set images, the method is generally being used to determine how to enhance such images prior to their deployment. Such images may be captured (e.g., via a scanner) by one or more authorized users of the computer or enterprise computing system. Such images may also be captured via automated methods using the computer or enterprise computing system. It is to be understood, however, that the embodiments of the method disclosed herein may also be utilized with images that have been deployed with an object. In some instances and as an example, the method is being used to determine how to revise the already deployed images in order to enhance any other like images that will be deployed in the future. Such images may be captured by any user (such as, for example, a customer, inspector, authenticator, or the like) after deployment specifications are set.

The captured image(s) is/are then transformed at least one time, and often multiple times, using one or more pipelines. Each pipeline performed on the captured image results in the formation of a different transformed image. As such, if two different pipelines are run on one captured image, two different transformed images are generated.

Upon receiving the captured image, the computer or enterprise computing system toggles through the pipelines stored thereon in order to determine which pipelines are suitable for the image. More particularly, a user of the system may input information about a particular desirable end use for the image, and the system may toggle (sequence) through pipelines which have been designated or associated with such end use. For example, the pipelines that are available may be designated for restoration, improving quality (e.g., for forensics, authentication, inspection, photo projects, etc.), quality assurance (total image or region-based), authentication, or other like end uses.

The act of transforming the captured image via the pipelines is shown schematically and collectively at reference numeral 102. In this non-limiting example, pipelines A, B, and C are selected to transform the captured image. It is to be understood, however, that any suitable pipeline which is available may be run on the image. As such, any number of pipelines may be used to transform the image(s). Examples of suitable image processing algorithms that make up the pipelines are listed hereinabove.

Functional metrics are generated for each transformed image. The set of functional metrics defines the transformed image in terms of one or more of its characteristics. After the images are transformed, the system automatically generates the corresponding functional metrics for such images. The set of metrics that is used to define the specific functional metrics for each transformed image is general enough to accommodate a wide variety of image types. Such metrics may include histogram information for each of the primary printing (cyan, magenta and yellow) and displaying (red, green and blue) colors. In addition, the metric set may also include information extrapolated form the hue/saturation/intensity, or HSI, histograms. Such information may include mean, standard deviation, skew and kurtosis of the histogram, along with histogram entropy and "energy spectral density" by band. In some instances, the functional metric set may also include frequency information including the percentage of energy spectral density in various frequency bands, etc. (as determined by Image Fast Fourier Transforms (FFTs)). Still other suitable metrics in the metric set may include halftone patterning, palette/gamut, and region size, shape and/or distribution, and combinations thereof. It is to be understood that this is not an exhaustive list, and that any other suitable metrics may be used to characterize the transformed images.

It is to be understood that the one or more images in the ground truth set are also associated with a functional metric set. Such set is generally defined for the images when the ground truth set is generated. Any of the previously discussed metrics may be used to characterize the image(s) in the ground truth set.

The method then includes comparing the functional metric set for each of the transformed images with the functional metric set for each image in the ground truth set, as shown at reference numeral 104. It is to be understood that the results of the comparison will indicate which transformed image is functionally most similar to the desired image in the ground truth set. A transformed image that is "functionally most similar" may or may not be the image that is overtly equivalent with the ground truth set image. As a non-limiting example, the functionally most similar transformed image may have the greatest number of quality metrics corresponding with the quality metrics of the ground truth set image, but will not be overtly equivalent with the ground truth set image. As discussed further hereinbelow, the transformed image which is functionally most equivalent may depend, at least in part, on the desirable end use for the image.

As described hereinabove, the ground truth set includes one or more images and their corresponding functional metrics that represent the original image or another similar image that does not require additional processing for use in an end application. Such an image has generally not been exposed to copying, scanning, or any other like process which tends to degrade the image, except where necessary or desirable as part of the intended end application/workflow (and in such instances, the ground truth image is exposed to no additional alterations). For example, if a ground truth image is generated during image testing, the ground truth image will be exposed to those transformations and experiences (e.g., copying, scanning, or the like) that will be applied to an image during final deployment. Determining which images will be ground truth images may be accomplished using quality grading metrics, by successful reading of the information in the image, by scoring of the image, or any other like technique(s) which result in a desirable image that may be used as a standard to which other images are compared. The ground truth set (i.e., images and corresponding metrics) may be stored in, and accessible from, for example, a secure registry (shown as reference numeral 106).

The pipelines used to transform the captured image and the comparison made between respective metrics of the transformed images and the ground truth set image(s) will depend, at least in part, on the utility of the image in a specific end application (e.g., scrap booking, authentication, restoration, quality assurance, etc.). For example, the pipelines and metric comparison involved when restoration of the image is desired may be different from the pipelines and metric comparison involved when image quality for scrap booking is desired.

When restoration is desired, the goal of the pipeline is to transform the captured image from its (usually pejoratively) altered form to an optimal representation of its original intended appearance. Restoration may be accomplished to render an otherwise unusable image usable. For example, some loss of information during scanning is inevitable, and so restoration is concerned with reversing the loss of information without introducing ectopic information. Multiple pipelines that may transform the captured image back to its original appearance may be selected and run on the captured image. Furthermore, transformations that reverse the effect of printing and scanning may also be considered and used for restoration.

For restoration, a classification approach may be used to compare the metrics of the transformed images with the metrics of the ground truth set in order to determine which pipeline best restores the captured image. In this embodiment, the ground truth set includes the original (not deployed, not captured, not transformed, etc.) image. Using a metric-based classification approach (such as that described in Simske et al., "Low-resolution photo/drawing classification: metrics, method and archiving optimization", *Proceedings of the 2005 ACM Symposium on Document Engineering*, pp. 127-129 (2005, ISBN-59593-240-2), which is incorporated herein by reference in its entirety), another set of metrics is defined which best distinguishes the untransformed captured image from the ground truth set image (in this example, the original image). Metric and weighted distances of each of the transformed images from the ground truth set image are then determined. The transformed image having the minimum distance from the original image is the optimally transformed image. It is to be understood that the pipeline corresponding with the optimally transformed image may be selected for future deployment of this image. It is believed that by implementing the corresponding pipeline prior to future image deployment, the deployed image will not be degraded for its intended purpose after its capture (e.g., exposed to scanning, etc.).

When image enhancement is desirable, the pipeline selected and the metric comparison made will depend, at least in part, on the desired end use for the image. Generally, the image enhancement pipelines automatically improve the preferred appearance, or quality, of a captured image. However, a photo captured by a digital camera meant to be scrap booked will require a different pipeline than an image captured to have the 2D barcode extracted and decoded. Therefore, the pipelines that are selected for captured image transformation will depend on the end use. Any reasonable machine learning approach may be used to explore the set of all transformation pipelines, including a raw/exhaustive search of the $2^N$ pipelines.

In such instances, the ground truth set is a set of images, each of which corresponds with quality metrics that meet the desired image appearance quality for one particular end use. The metrics for each of the transformed images may be compared with the metrics associated with one or more of the images in the ground truth set. As one example, if information is input into the system pertaining to the fact that the end use for the captured image is 2D barcode extraction and decoding, the system will compare the metrics of the transformed images to that/those metrics for image(s) in the ground truth that are earmarked as having sufficient quality for such purpose. As another example, the system may determine which of the pipelines used to transform the 2D barcode captured with a barcode reader (e.g., barcode camera) gives the highest reading accuracy (based on the comparison with the ground truth set information).

The transformed images will then be ranked based upon their respective closeness to the ground truth set image associated with the end use. In one embodiment, the transformed image which has the most matching quality metrics with the ground truth set image for the same end use is deemed the optimally transformed image. For example, a transformed image matching 99 out of 100 quality metrics of a ground truth image outranks another of the transformed images which matches 98 out of the 100 quality metrics of the ground truth image. In this example, the pipeline corresponding with the transformed image matching 99 out of 100 quality metrics may be selected for future deployment of this image. In another embodiment, the transformed image which has a single matching quality metric (e.g., readability of barcodes, actionability for embedded message, perceived value by user selecting of the image for printing, etc.) with the ground truth image is deemed the optimally transformed image. As such, the quality comparison may be quantitative, qualitative, or a combination thereof, depending, at least in part, on the end application/workflow/goal. It is believed that by implementing the corresponding pipeline prior to future image deployment, the deployed image will retain sufficient quality for its intended purpose after its capture (e.g., exposed to scanning, etc.).

For general image enhancement or quality, the assessment may be made by an educated end customer (e.g., a brand owner, artist, etc.).

When quality assurance (QA) is desirable, the absolute and relative grading of the transformed images is of concern. In this particular embodiment, the ground truth set includes a plurality of images, each of which is associated with one or more quality metrics. The set of metrics correlated with the transformed image having the desirable grading (e.g., the most matches or a single desirable match with the quality metrics of the ground truth set) are used as the quality assurance metrics for subsequent image deployment. In other words, the pipeline used to achieve the transformed image having desirable grading may be selected for future image deployment.

When inspection is the desired end use, region-based quality assurance pipelines may be utilized. Regions of interest in the captured image may be isolated using zoning analysis, which may include thresholding, segmentation, and classifications of various zones/regions in the captured image. Each region may be transformed simultaneously or in parallel using one or more quality assurance pipelines. Each region may also be associated with a different set of metrics. In this particular embodiment, the ground truth set includes at least one image with a plurality of regions, each of which is also associated with a set of quality metrics. After comparing the metric(s) of the regions in the transformed region(s) with the metric(s) of the region(s) in the ground truth set, the region of the transformed image with the highest overall quality assurance metric score (e.g., the most matching metrics or one or more particular matching metrics) is selected as the region for inspection.

In other instances when inspection is the desired end use, the comparison of the metrics of the transformed images with the metrics of the ground truth image(s) includes running an image matching algorithm against each of the plurality of transformed images and each image in the ground truth set. The image matching algorithm may be run at a plurality of fiducial points and at a plurality of points offset from the fiducial points of the images. After the image matching algorithm is complete, one can determine if one or more of the fiducial points or points offset from the fiducial points match between one of the plurality of transformed images and an image in the ground truth set. A match existing between one or very few points in the transformed image and ground truth set image may be suitable for low-end inspection (i.e., raw image quality assurance), where the goal is to simply ensure that the deployed images include ink. Alternatively, this embodiment may be used for high-end inspection, where the goal is more in-depth specifications of inspection, such as color matching, size matching, contrast matching, etc. It is to be understood that the image matching algorithm embodiment for inspection may be particularly suitable when a template is used to produce a variable data print job.

When authentication is the desired end use, pipelines which result in a transformed image having a readable security deterrent are considered to be the best pipelines. In the ground truth set for authentication, the security deterrents are readable (i.e., information hidden within the security deterrent is read correctly), and any metrics associated with such correctly readable deterrents are considered to be of sufficient quality. It is to be understood that a by-metric-matching approach may not be desirable in this embodiment. Rather, since authentication is the successful extraction of the explicitly-injected information from the image, simple extraction accuracy assessment may suffice. The transformed image from which information is extracted may then be authenticated using known techniques.

It is to be understood that in all of the previous non-limiting examples, the pipelines run on the captured image(s) are independent of or distinct from the metrics used to compare the transformed images with the ground truth set. This distinctness enables more pipelines to be used.

As illustrated in the above non-limiting example, the comparison of the transformed image (metrics thereof) with the image(s) (metrics thereof) in the ground truth set enables the system to determine which of the pipelines generates a transformed image that is functionally closest to the ground truth set. In some instances, this identified pipeline is selected for future image deployment or the metrics associated with the identified pipeline are selected for future image deployment, as shown at reference numeral 106, and in other instances, the image transformed via the identified pipeline is simply utilized for the intended purpose (e.g., inspection, authentication, etc.).

As briefly mentioned hereinabove, the desirable transformed image may be selected based on its usefulness in downstream (i.e., after image deployment with an object) decision making or product/object tracking. For example, the transformed image may be selected because it is particularly suitable for routing the object to the correct location if the image includes an embedded address, for associating the object/product with the correct production run, for charging a suitable price if the object/product includes a point of sale data item, for associating the object with the right workflow if it is a (financial, etc.) document, or for other like downstream processes.

While several embodiments have been described in detail, it will be apparent to those skilled in the art that the disclosed embodiments may be modified. Therefore, the foregoing description is to be considered exemplary rather than limiting.

What is claimed is:

1. A method for testing image pipelines, the method comprising:
    performing a plurality of pipelines in their entirety, thereby transforming an untransformed captured image multiple times to generate a plurality of transformed images;
    comparing a functional set of metrics associated with each of the plurality of transformed images with a functional set of metrics associated with each image in a ground truth set; and
    from the comparison, determining which of the plurality of pipelines generates a transformed image that is functionally closest to an image in the ground truth set;
    wherein each of the steps is performed by a processor executing computer readable code embodied on a non-transitory, computer readable medium.

2. The method as defined in claim 1 wherein each of the plurality of pipelines is selected from a pipeline for restoring the untransformed captured image to its original appearance, a pipeline for improving an image quality of the untransformed captured image for a predetermined end-use, a pipeline for quality assurance, a pipeline for region-based quality assurance, a pipeline for authentication, or combinations thereof.

3. The method as defined in claim 1 wherein the method further includes ranking each of the plurality of transformed images based upon the comparison of the respective functional sets of metrics, and wherein the determining step includes selecting one of the plurality of pipelines that corresponds with one of the plurality of transformed images having a rank sufficient for satisfaction of a predetermined end application, the ranking being accomplished by the processor executing the computer readable code.

4. The method as defined in claim 1 wherein the ground truth set includes a plurality of images, each of which corresponds with at least one predetermined image quality appearance metric, and wherein the determining includes identifying one of the plurality of plurality of pipelines that generates a transformed image having at least one image quality appearance metric that matches the at least one predetermined image quality appearance metric of the image, which is one of the plurality of images in the ground truth set.

5. The method as defined in claim 1 wherein the ground truth set includes a plurality of images, each of which corresponds with at least one predetermined quality metric, and wherein the determining includes identifying one of the plurality of pipelines that generates a transformed image having at least one quality metric that matches the at least one predetermined quality metric of the image, which is one of the plurality of images in the ground truth set.

6. The method as defined in claim 1 wherein the image in the ground truth set includes a plurality of regions of interest, each of which corresponds with at least one predetermined quality metric, and wherein the determining includes identifying one of the plurality of pipelines that generates a transformed image having at least one quality metric that matches the at least one predetermined quality metric of one of the plurality of regions in the image in the ground truth set.

7. The method as defined in claim 1 wherein the image in the ground truth set includes a security deterrent of sufficient quality such that information hidden within the security deterrent can be read, and wherein the determining includes identifying one of the plurality of pipelines that generates a transformed image having a quality metric that matches the quality of the security deterrent.

8. The method as defined in claim 1 wherein each of the plurality of pipelines includes one or more image processing algorithms.

9. The method as defined in claim 1 wherein the plurality of pipelines selected for transforming the untransformed captured image is distinct from the respective functional sets of metrics used for comparing the plurality of transformed images with the images in the ground truth set.

10. The method as defined in claim 1 wherein prior to transforming, the method further comprises:
   inputting an end application for the untransformed captured image; and
   selecting the plurality of pipelines based upon the input end application;
   the inputting and selecting being accomplished by the processor executing the computer readable code.

11. The method as defined in claim 10 wherein the end application involves utilizing at least one of the plurality of transformed images for downstream object tracking.

12. The method as defined in claim 10 wherein the end application is chosen from scrap booking, forensics, authentication, inspection, restoration, and quality assurance.

13. A method for testing image pipelines, the method comprising:
   transforming an untransformed captured image multiple times using a plurality of pipelines, thereby generating a plurality of transformed images;
   comparing a functional set of metrics associated with each of the plurality of transformed images with a functional set of metrics associated with each image in a ground truth set; and
   from the comparison, determining which of the plurality of pipelines generates a transformed image that is functionally closest to an image in the ground truth set;
   wherein:
   each of the plurality of pipelines is selected from a pipeline for restoring the untransformed captured image to its original appearance, a pipeline for improving an image quality of the untransformed captured image for a predetermined end-use, a pipeline for quality assurance, a pipeline for region-based quality assurance, a pipeline for authentication, or combinations thereof;
   an original image of the untransformed captured image is the image in the ground truth set;
   the comparing step includes:
      defining a metric set which distinguishes the untransformed captured image from the original image; and
      using the metric set to compare each of the plurality of transformed images to the original image by calculating metric and weighted metric distances of each of the plurality of transformed images from the original image; and
   each of the steps is performed by a processor executing computer readable code embodied on a non-transitory, computer readable medium.

14. The method as defined in claim 13 wherein the determining step includes:
   identifying one of the plurality of transformed images that has a minimum distance from the original image; and
   identifying one of the plurality of pipelines that corresponds with the one of the plurality of transformed images having the minimum distance.

15. The method as defined in claim 14, further comprising selecting, for deployment of subsequent images, the one of the plurality of pipelines that corresponds with the one of the plurality of transformed images having the minimum distance, the selecting being accomplished by the processor executing the computer readable code.

16. A method for testing image pipelines, the method comprising:
   transforming an untransformed captured image multiple times using a plurality of pipelines, thereby generating a plurality of transformed images;
   comparing a functional set of metrics associated with each of the plurality of transformed images with a functional set of metrics associated with each image in a ground truth set, wherein comparing includes executing an image matching algorithm against each of the plurality of transformed images and each image in the ground truth set at a plurality of fiducial points and at a plurality of points offset from the fiducial points; and
   from the comparison, determining which of the plurality of pipelines generates a transformed image that is functionally closest to an image in the ground truth set, wherein determining includes identifying the transformed image that is functionally closest to the image in the ground truth set by recognizing that a predetermined number of the fiducial points or a predetermined number of the points offset from the fiducial points match between one of the plurality of transformed images and an image in the ground truth set;
   wherein each of the steps is performed by a processor executing computer readable code embodied on a non-transitory, computer readable medium.

17. A system for testing image pipelines, the system comprising:
   a processor to execute computer readable code embodied on a non-transitory, computer readable medium; and
   the computer readable code, when executed, causes the processor to:
      perform a plurality of pipelines in their entirety to transform an untransformed captured image multiple times to generate a plurality of transformed images;
      compare a functional set of metrics associated with each of the plurality of transformed images with a functional set of metrics associated with each image in a ground truth set; and
      determine, based on the comparison, which of the plurality of pipelines generates a transformed image that is functionally closest to the ground truth set.

18. The system as defined in claim 17 wherein each of the plurality of pipelines includes one or more image processing algorithms that are executable via the processor.

19. The system as defined in claim 18 wherein each of the plurality of pipelines is selected from median filtering, dilation, erosion, sharpening, unsharp masking, halftone removal, contrast, auto-exposure, convolution, deblurring, thresholding, blurring, denoising, despeckling, texture fill, brightness correction, gamma correction, color balancing, skew correction, and combinations thereof.

20. The system as defined in claim 17 wherein:
   the computer readable code to compare further causes the processor to execute an image matching algorithm against each of the plurality of transformed images and each image in the ground truth set at a plurality of fiducial points and at a plurality of points offset from the fiducial points; and
   the computer readable code to determine further causes the processor to identify the transformed image that is functionally closest to the image in the ground truth set by recognizing that a predetermined number of the fiducial points or a predetermined number of the points offset from the fiducial points match between one of the plu rality of transformed images and an image in the ground truth set.

21. The system as defined in claim 17 wherein the computer readable code to compare further causes the processor to:
  define a metric set which distinguishes the untransformed captured image from the original image; and
  use the metric set to compare each of the plurality of transformed images to the original image by calculating metric and weighted metric distances of each of the plurality of transformed images from the original image.

* * * * *

UNITED STATES PATENT AND TRADEMARK OFFICE
CERTIFICATE OF CORRECTION

PATENT NO. : 8,269,849 B2  
APPLICATION NO. : 12/359267  
DATED : September 18, 2012  
INVENTOR(S) : Steven J. Simske et al.

Page 1 of 1

It is certified that error appears in the above-identified patent and that said Letters Patent is hereby corrected as shown below:

In column 9, line 42, in Claim 13, delete "end- use," and insert -- end-use, --, therefor.

Signed and Sealed this
Fifth Day of February, 2013

Teresa Stanek Rea
*Acting Director of the United States Patent and Trademark Office*